（12）United States Patent
Horimoto et al.

(10) Patent No.: US 10,511,034 B2
(45) Date of Patent: Dec. 17, 2019

(54) GASKET FOR FUEL BATTERY

(71) Applicant: NOK CORPORATION, Tokyo (JP)

(72) Inventors: Takayuki Horimoto, Fujisawa (JP); Hajime Yui, Fujisawa (JP)

(73) Assignee: NOK Corporation (JP)

( * ) Notice: Subject to any disclaimer, the term of this patent is extended or adjusted under 35 U.S.C. 154(b) by 41 days.

(21) Appl. No.: 15/541,900

(22) PCT Filed: Jan. 6, 2016

(86) PCT No.: PCT/JP2016/050189
§ 371 (c)(1),
(2) Date: Jul. 6, 2017

(87) PCT Pub. No.: WO2016/121425
PCT Pub. Date: Aug. 4, 2016

(65) Prior Publication Data
US 2017/0365863 A1 Dec. 21, 2017

(30) Foreign Application Priority Data
Jan. 30, 2015 (JP) .................. 2015-016574

(51) Int. Cl.
H01M 2/08 (2006.01)
H01M 2/14 (2006.01)
(Continued)

(52) U.S. Cl.
CPC ....... *H01M 8/0276* (2013.01); *H01M 8/0254* (2013.01); *H01M 8/0271* (2013.01); *H01M 8/10* (2013.01)

(58) Field of Classification Search
None
See application file for complete search history.

(56) References Cited

U.S. PATENT DOCUMENTS 7,063,911 B1* 6/2006 Nagai ............... B29C 45/14344
429/435
7,833,673 B2* 11/2010 Morimoto ........... H01M 8/0273
429/463
(Continued)

FOREIGN PATENT DOCUMENTS

CA 2760979 A1 11/2010
CA 2889861 A1 5/2014
(Continued)

OTHER PUBLICATIONS

Machine Translation for JP2006-156216 (previously submitted with only English-language abstract), 7 pages.
(Continued)

*Primary Examiner* — Jonathan G Jelsma
*Assistant Examiner* — Julian Anthony
(74) *Attorney, Agent, or Firm* — Harness, Dickey & Pierce, P.L.C.

(57) ABSTRACT

The invention provides gasket for a fuel battery provided in a fuel battery cell in which an intermediate part including an MEA is interposed between a pair of separators, and structured such that each of a gasket main body retained to one separator of the pair of separators and a gasket main body retained to the other separator comes into contact with the intermediate part at positions where they overlap planarly, wherein bank portions for fixed size stop according to a gasket thickness are integrally formed in both sides or one side in a width direction of both the gasket main bodies. The bank portions for fixed size stop are preferably supported by convex portions which are provided in the separators. Therefore, it is possible to inhibit gasket main bodies from being compressed beyond supposition in the case that contact portions of the gasket main bodies are compressed.

2 Claims, 2 Drawing Sheets

(51) Int. Cl.
  *H01M 2/38* (2006.01)
  *H01M 2/40* (2006.01)
  *H01M 8/24* (2016.01)
  *H01M 8/0276* (2016.01)
  *H01M 8/10* (2016.01)
  *H01M 8/0271* (2016.01)
  *H01M 8/0254* (2016.01)

(56) References Cited

U.S. PATENT DOCUMENTS

| | | | | |
|---|---|---|---|---|
| 2005/0089745 | A1* | 4/2005 | Sugita | H01M 8/0271 429/469 |
| 2012/0064429 | A1 | 3/2012 | Taguchi et al. | |
| 2013/0241158 | A1* | 9/2013 | Koga | H01M 2/08 277/628 |

FOREIGN PATENT DOCUMENTS

| | | |
|---|---|---|
| CN | 102428599 A | 4/2012 |
| EP | 2434568 A1 | 3/2012 |
| EP | 3 252 857 A1 | 12/2017 |
| JP | 2005-005191 A | 1/2005 |
| JP | 2005-166508 A | 6/2005 |
| JP | 2006-156216 A | 6/2006 |
| JP | 2006-236671 A | 9/2006 |
| JP | 2011-003528 A | 1/2011 |
| JP | 2013-101849 A | 5/2013 |
| KR | 10-2012-0022892 A | 3/2012 |
| WO | WO-2010-134421 A1 | 11/2010 |

OTHER PUBLICATIONS

Machine Translation for JP2011-003528 (previously submitted with only English-language abstract), 7 pages.
Machine Translation for JP2013-101849 (previously submitted with only English-language abstract), 9 pages.
Extended European Search Report for Patent Application No. EP16743029.7, dated Nov. 11, 2017, 8 pages.

* cited by examiner

GASKET FOR FUEL BATTERY

CROSS-REFERENCE TO RELATED APPLICATIONS

This application is a U.S. National Stage Application of International Application No. PCT/JP2016/050189, filed on Jan. 6, 2016, and published in Japanese as WO 2016/121425 A1 on Aug. 4, 2016 and claims priority to Japanese Application No. 2015-016574, filed on Jan. 30, 2015. The entire disclosures of the above applications are incorporated herein by reference.

BACKGROUND OF THE INVENTION

Field of the Invention

The present invention relates to a gasket for a fuel battery, the gasket constructing a seal portion in a fuel battery cell.

Description of the Conventional Art

A gasket for a fuel battery includes a membrane surface seal which seals an ion exchange membrane, and a cooling medium seal which seals a cooling side. As a method of assembling the gasket, there are a method of integrally forming a gasket with a separator or a cell member, for example, MEA and GDL, a method of integrally forming a gasket with a resin reinforcing body with an adhesive material so as to attach to a cell member such as a separator, and a method of forming a gasket as a single body so as to be assembled in a cell member. As a method of fastening a stack, there are a method of fastening the stack to a certain dimension (thickness), and a method of fastening the stack with a certain load. In the case of designing a gasket in the latter fastening method with the determined load, it is necessary to take into consideration a compression state of the used GDL and the load.

Further, as a kind of a gasket for a fuel battery, there has been conventionally known as shown in FIG. 3, a gasket 11 provided in a fuel battery cell 51 in which an intermediate part 54 including an MEA 55 is interposed between a pair of separators 52 and 53, and structured such that each of a first gasket main body 21 and a second gasket main body 31 comes into contact with the intermediate part 54 at positions where they overlap planarly, the first gasket main body 21 being retained to the one separator 52 of a pair of separators 52 and 53, and ht second gasket main body 31 being retained to the other separator 53. A lip-shaped contact portion 23 having a chevron cross section is provided in the first gasket main body 21 of both the gasket main bodies 21 and 31 and a contact portion 33 having a flat surface shape is provided in the second gasket main body 31, in such a manner that a seal surface pressure can be secured even if the planar arrangement of both the gasket main bodies 21 and 31 is somewhat deviated.

In the case of the gasket 11 for the fuel battery in FIG. 3 mentioned above, the lip-shaped contact portion 23 of the first gasket main body 21 and the flat surface shaped contact portion 33 of the second gasket main body 31 are structured such as to be compressed in such a manner as to pinch the intermediate part 54 when being fastened to the cell. The gasket main bodies 21 and 31 are likely to be compressed beyond supposition in the case that a fastening load of a GDL 56 is small, the GDL 56 being arranged as the intermediate part 54 together with the MEA 55.

SUMMARY OF THE INVENTION

Problem to be Solved by the Invention

The present invention is made by taking the above points into consideration, and an object of the present invention is to provide a gasket for a fuel battery which can inhibit gasket main bodies from being compressed beyond supposition in a structure in which contact portions of the gasket main bodies are compressed in such a manner as to pinch an intermediate part when being fastened to a cell.

Means for Solving the Problem

In order to achieve the above object, a gasket for a fuel battery according to a first aspect of the present invention is a gasket for a fuel battery provided in a fuel battery cell in which an intermediate part including an MEA is interposed between a pair of separators, and structured such that each of a gasket main body retained to one separator of the pair of separators and a gasket main body retained to the other separator comes into contact with the intermediate part at positions where they overlap planarly, wherein bank portions for fixed size stop according to a gasket thickness are integrally formed in both sides or one side in a width direction of both the gasket main bodies.

A gasket for a fuel battery according to a second aspect of the present invention is the gasket for the fuel battery described in the first aspect mentioned above, wherein the bank portions for fixed size stop are supported by convex portions which are provided in the separators.

Further, a gasket for a fuel battery according to a third aspect of the present invention is the gasket for the fuel battery described in the second aspect mentioned above, wherein the convex portions are buried in the bank portions for fixed size stop.

Further, a gasket for a fuel battery according to a fourth aspect of the present invention is the gasket for the fuel battery described in the first, second or third aspect mentioned above, wherein the one gasket main body of the both gasket main bodies is provided with a lip-shaped contact portion having a chevron cross section and the other gasket main body is provided with a flat surface shaped contact portion, a concave portion is provided between the lip-shaped contact portion and the bank portion for fixed size stop in the one gasket main body, and a concave portion is provided between the flat surface shaped contact portion and the bank portion for fixed size stop in the other gasket main body.

In the gasket for the fuel battery according to the present invention having the structure mentioned above, the bank portion for fixed size stop according to the gasket thickness is integrally formed in both sides or one side in the width direction in both the gasket main bodies, and both the bank portions for fixed size stop come into contact with the intermediate part respectively at the positions where they overlap planarly when being fastened to the cell. As a result, both the bank portions for fixed size stop act as a spacer and an amount of compression is restricted as a whole of the gasket. Therefore, it is possible to inhibit the gasket main body from being compressed beyond supposition.

The bank portion for fixed size stop may be separately formed in relation to the gasket main body, however, it is advantageous that the bank portion for fixed size is integrally formed with the gasket main body in the light of a forming step since a metal mold cavity can be integrated. However, the bank portion for fixed size stop is made of the same material as that of the gasket main body by integrally forming the bank portion for fixed size stop with the gasket main body as mentioned above. As a result, there is fear that the bank portion for fixed size stop comes down or is reduced its height in the case that the bank portion for fixed size stop itself is strongly compressed.

Consequently, in order to device a countermeasure, it is preferable to arrange the convex portion in the separator and support the bank portion for fixed size stop by the convex portion. According to this structure, since the bank portion for fixed size stop which is made of a comparatively soft material is supported by the convex portion which is made of a comparatively hard material and is substantially increased its height, it is possible to inhibit the bank portion for fixed size stop from coming down.

Both the bank portions for fixed size stop may be arranged in a leading end in a height direction of the convex portion, as a shape in which both the bank portions for fixed size stop are supported by the convex portion, however, the convex portion may be buries in the bank portion for fixed size stop (in other words, the convex portion may be covered with the bank portion). According to this structure, the bank portion for fixed size stop is further hard to come down.

Further, as a shape in which the bank portion for fixed size stop is integrally formed with the gasket main body, it is preferable that the concave portion is provided between the lip-shaped contact portion and the bank portion for fixed size stop in the one gasket main body and the concave portion is also provided between the flat surface shaped contact portion and the bank portion for fixed size stop in the other gasket main body, on the assumption that the one gasket main body of both the gasket main bodies is provided with the lip-shaped contact portion having the chevron cross section, and the other gasket main body is provided with the flat surface shaped contact portion. According to the structure, even if the bank portion for fixed size stop is compressed, the contact portion is hard to be affected by the compression. Therefore, the seal surface pressure in the contact portion can be properly maintained.

Effect of the Invention

The present invention achieves the following effects.

In the present invention, it is possible to inhibit the gasket main body from being compressed beyond the supposition in the structure in which the contact portions of the gasket main bodies are compressed in such a manner as to pinch the intermediate part when being fastened to the cell as described above. Therefore, it is possible to maintain a durability of the gasket and a sealing performance achieved by the gasket over the long term.

DETAILED DESCRIPTION OF PREFERRED EMBODIMENTS

The following embodiments are included in the present invention.

(1) The present invention relates to a gasket shape. A gasket according to the present invention is used, for a gasket for a fuel battery.

(2) In the case of a conventional shape, the flat surface portion of the one gasket and the lip portion of the other gasket are structured such as to be compressed in such a manner as to pinch the MEA when being fastened, however, it is likely that the gasket is compressed beyond the supposition in the case that the fastening load of the GDL is small.

(3) In order to device a countermeasure of the above, the bank portion is provided by the side of the gasket, and the gasket is prevented from being compressed too much by being retained by the bank portion when being fastened.

(4) In the case that the bank portion is formed into a vertically long shape, the bank portion comes down at the fastening time and it is likely that the bank portion does not function as the retainer.

(5) Consequently, in order to device a countermeasure of the above, the convex portion of the separator is provided in the gasket forming portion, and the bank portion of the gasket is formed thereon.

(6-1) According to the structure, the reaction force of the bank portion at the fastening time tends to become higher by arranging the bank portion of the gasket on the separator convex portion. As a result, the seal portion is hard to be compressed too much. Further, it is possible to inhibit the GDL from being compressed beyond the supposition by regulating the height of the bank portion.

(6-2) The fastening load of the bank portion becomes high by forming the bank portion of the gasket in the separator convex portion. As a result, it is possible to inhibit the seal from being compressed too much.

(6-3) The fastening load of the bank portion become high by forming the bank portion of the gasket in the separator convex portion. As a result, it is possible to inhibit the GDL from being compressed beyond the supposition.

EMBODIMENTS

Next, a description will be given of embodiments according to the present invention with reference to the accompanying drawings.

First Embodiment

Figure 1:
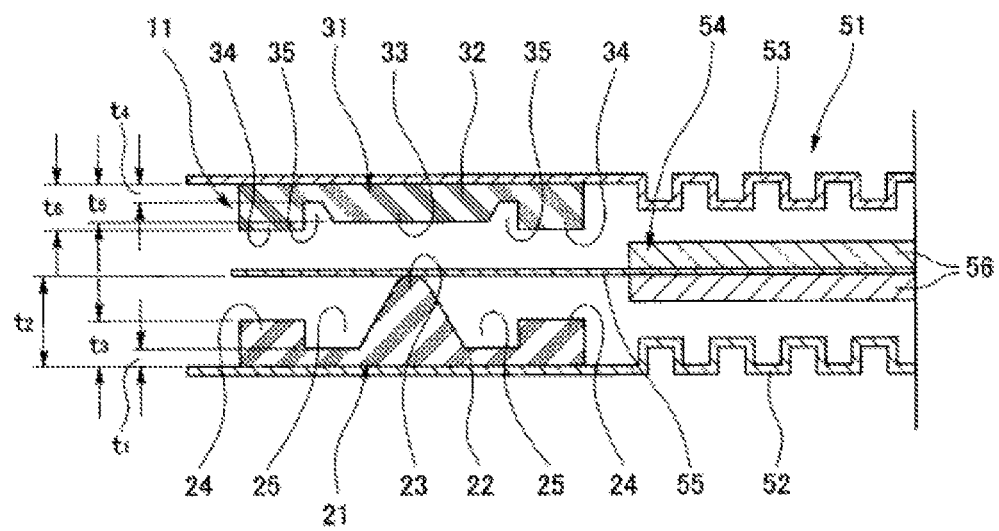
FIG. 1 is a cross sectional view of a substantial part of a gasket for a fuel battery according to a first embodiment of the present invention.
Figure 2:
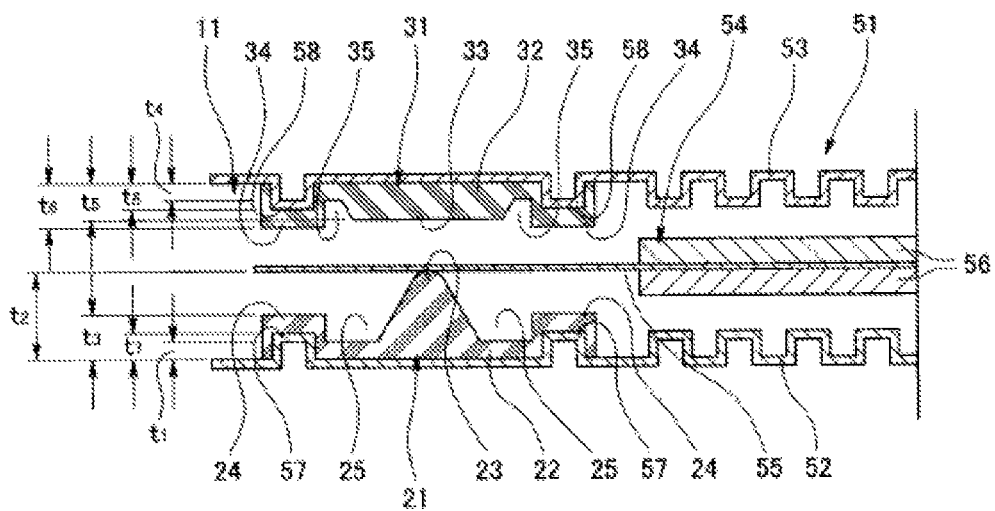
FIG. 2 is a cross sectional view of a substantial part of a gasket for a fuel battery according to a second embodiment of the present invention.
Figure 3:
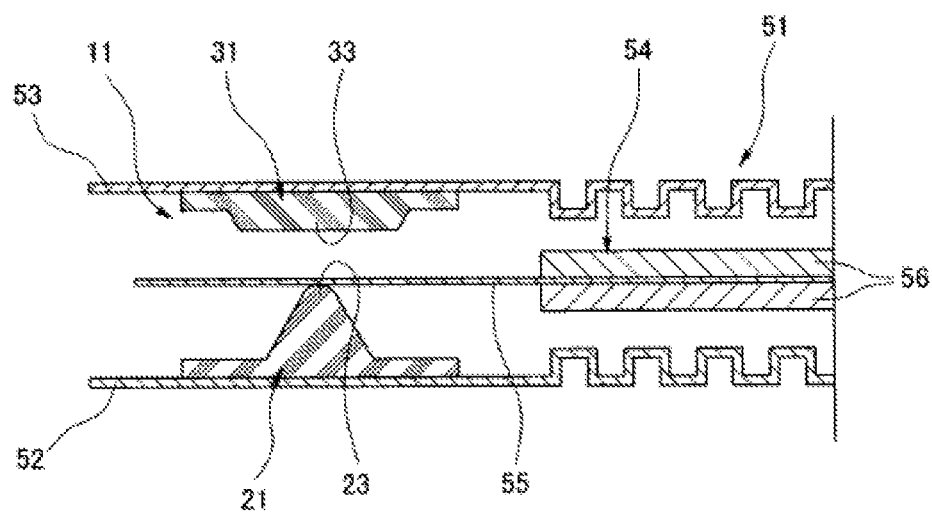
FIG. 3 is a cross sectional view of a substantial part of a gasket for a fuel battery according to a conventional example.

As shown in FIG. 1, a gasket 11 for a fuel battery according to the embodiment is a gasket provided in a fuel battery cell 51 which interposes an intermediate part 54 including a membrane electrode assembly (MEA) 55 and gas diffusion layers (GDL) 56 between a pair of separators 52 and 53, is provided with a gasket main body (a first gasket main body) 21 which is retained to one separator 52 of a pair of separators 52 and 53, and a gasket main body (a second gasket main body) 31 which is retained to the other separator 53, and is structured such that both the gasket main bodies 21 and 31 come into contact with the MEA 55 in the intermediate part 54 respectively at positions where they overlap planarly. Each of the gasket main bodies 21 and 31 is formed by a predetermined rubber-like elastic body.

The first gasket main body 21 in a lower side in FIG. 1 is provided with a flat plate shaped gasket base portion 22 and a lip-shaped contact portion 23 having a chevron cross section, and the lip-shaped contact portion 23 having the chevron cross section is integrally formed at the center portion in a width direction of the flat plate shaped gasket base portion 22. Further, bank portions 24 for fixed size stop according to a gasket thickness are integrally formed respectively so as to be positioned in both sides in the width direction of the first gasket main body 21, and concave portions 25 are formed respectively between the lip-shaped contact portion 23 and the bank portions 24 for fixed size stop. A dimensional relationship between thicknesses (heights) of the gasket base portion 22, the lip-shaped contact portion 23 and the bank portions 24 for fixed size stop is set to t1<t3<t2 on the assumption that the thickness of the gasket base portion 22 is set to t1, the thickness of the lip-shaped contact portion 23 is set to t2, and the thickness of the bank portions 24 for fixed size stop is set to t3.

Meanwhile, the second gasket main body 31 in an upper side in FIG. 1 is provided with a flat plate shaped gasket base portion 32 and a flat surface shaped contact portion 33, and the flat surface shaped contact portion 33 is formed integrally at the center portion in a width direction of the flat plate shaped gasket main body 32. Further, bank portions 34 for fixed size stop according to the gasket thickness are formed integrally so as to be positioned in both sides in the width direction of the second gasket main body 31, and concave portions 35 are formed respectively between the flat surface shaped contact portion 33 and the bank portions 34 for fixed size stop. A dimensional relationship between thicknesses (heights) of the gasket base portion 32, the flat surface shaped contact portion 33 and the bank portions 34 for fixed size stop is set to t4<t5<t6 on the assumption that the thickness of the gasket base portion 32 is set to t4, the thickness of the flat surface shaped contact portion 33 is set to t5 and the thickness of the bank portions 34 for fixed size stop is set to t6.

In the gasket 11 for the fuel battery having the structure mentioned above, the bank portions 24 and 34 for fixed size stop according to the gasket thickness are integrally formed respectively in both sides in the width direction of the first and second gasket main bodies 21 and 31, and both the bank portions 24 and 34 for fixed size stop come into contact with the MEA 55 in the intermediate part 54 respectively at the positions where they overlap planarly when being fastened to the cell. As a result, both the bank portions 24 and 34 for fixed size stop act as a spacer, and an amount of compression is accordingly restricted as a whole of the gasket 11. Therefore, it is possible to inhibit the gasket main bodies 21 and 31 from being compressed beyond supposition and inhibit a durability and a sealing performance thereof from being deteriorated.

Further, as a shape for forming the bank portions 24 and 34 for fixed size stop integrally in relation to the gasket main bodies 21 and 31, the first gasket main body 21 is provided with the lip-shaped contact portion 23 having the chevron cross section and the second gasket main body 31 is provided with the flat surface shaped contact portion 33 in both the gasket main bodies 21 and 31, and the concave portions 35 are provided between the flat surface shaped contact portion 33 and the bank portions 34 for fixed size stop in the second gasket main body 31 as well as the concave portions 25 are provided between the lip-shaped contact portion 23 and the bank portions 24 for fixed size stop in the first gasket main body 21. As a result, even if the bank portions 24 and 34 for fixed size stop are compressed, the contact portions 23 and 33 are hard to be affected by the compression. Therefore, it is possible to properly maintain the seal surface pressure in the contact portions 23 and 33.

Second Embodiment

Next, a gasket 11 for a fuel battery according to a second embodiment is structured such that convex portions 57 and 58 are provided respectively in the separators 52 and 53 in addition to the same structure as the first embodiment, and the bank portions 24 and 34 for fixed size stop are supported by the convex portions 57 and 58, respectively. The convex portions 57 and 58 are formed into a hollow three-dimensional shape, for example, by pressing a part of the separators 52 and 53 made of a metal, and a whole or a part (a whole in the drawing) of the convex portions 57 and 58 is buried in the bank portions 24 and 34 for fixed size stop.

Therefore, according to the structure, since the bank portions 24 and 34 for fixed size stop which are made of a comparatively soft material are supported by the convex portions 57 and 58 which are made of a comparatively hard material, it is possible to inhibit the bank portions 24 and 34 for fixed size stop from coming down.

A thickness (a height) t7 of the convex portion 57 is preferably set to a relationship t1<t7<t3 on the basis of its function on the assumption that the thickness of the gasket base portion 22 is set to t1 and the thickness t3 of the bank portion 24 for fixed size stop is set to t3, and a thickness (a height) t8 of the convex portion 58 is preferably set to a relationship t4<t8<t6 and t8<t5 on the basis of its function in the same manner on the assumption that the thickness t4 of the gasket base portion 32 is set to t4, the thickness t5 of the flat surface shaped contact portion 33 is set to t5, and the thickness of the bank portion 34 for fixed size stop is set to t6.

In the first and second embodiment mentioned above, the bank portions 24 and 34 for fixed size stop are provided respectively in both sides in the width direction of the gasket main bodies 21 and 31, however, the bank portions 24 and 34 for fixed size stop may be provided only in one side in the width direction of the gasket main body 21.

What is claimed is:

1. A gasket for a fuel battery provided in a fuel battery cell in which an intermediate part including an MEA is interposed between a first separator and a second separator, the gasket for the fuel battery comprising:
   a first gasket main body attached to the first separator;
   a second gasket main body attached to the second separator;
   wherein the first and second gasket main bodies contact the intermediate part at positions where the first and second gasket main bodies overlap each other in a plan view;
   wherein the first and second gasket main bodies each include a pair of bank portions that are unitary with and formed on opposing sides of the respective gasket main body and configured for fixed size stop according to a gasket thickness,
   wherein the bank portions for fixed size stop are supported by convex portions which are defined by pressed three-dimensional hollow shapes formed in the first and second separators;
   wherein the convex portions are buried in the bank portions for fixed size stop.

2. The gasket for the fuel battery according to claim 1, wherein the first gasket main body is provided with a lip-shaped contact portion having a chevron cross section and the second gasket main body is provided with a flat surface shaped contact portion, a concave portion is provided between the lip-shaped contact portion and each of the bank portions for fixed size stop in the first gasket main body, and a concave portion is provided between the flat surface shaped contact portion and each of the bank portions for fixed size stop in the second gasket main body.

\* \* \* \* \*